(12) United States Patent
Suzuki

(10) Patent No.: US 9,906,186 B2
(45) Date of Patent: Feb. 27, 2018

(54) HOLDING FRAME AND SOLAR CELL MODULE

(75) Inventor: Masayoshi Suzuki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/394,880

(22) PCT Filed: Jul. 20, 2012

(86) PCT No.: PCT/JP2012/068467
§ 371 (c)(1),
(2), (4) Date: Oct. 16, 2014

(87) PCT Pub. No.: WO2014/013611
PCT Pub. Date: Jan. 23, 2014

(65) Prior Publication Data
US 2015/0122332 A1    May 7, 2015

(51) Int. Cl.
*H02S 20/00*     (2014.01)
*H02S 30/10*     (2014.01)
*F24J 2/52*      (2006.01)

(52) U.S. Cl.
CPC ............. *H02S 20/00* (2013.01); *F24J 2/5211* (2013.01); *H02S 30/10* (2014.12); *F24J 2002/5213* (2013.01)

(58) Field of Classification Search
None
See application file for complete search history.

(56) References Cited

U.S. PATENT DOCUMENTS

| 8,607,511 B2 | 12/2013 | Hirayama |
| 2010/0288338 A1* | 11/2010 | Yamamoto ............. F24J 2/4614 136/251 |

(Continued)

FOREIGN PATENT DOCUMENTS

| CN | 101981706 A | 2/2011 |
| JP | 59-138251 | 9/1984 |

(Continued)

OTHER PUBLICATIONS

Machine translation of JP2009-057757A.*
JP10-004207A machine translation.*
JP2000-243998A machine translation.*

(Continued)

*Primary Examiner* — Eric R Smith
(74) *Attorney, Agent, or Firm* — Buchanan Ingersoll & Rooney PC

(57) ABSTRACT

A holding frame includes a main frame member extending along a first side of the light-receiving surface, and a sub-frame member extending along a second side adjacent to the first side, wherein the main frame member includes a main outer wall extending along the first side, main holding units formed on the main outer wall to hold the solar cell panel from the first-side side, and a main bottom piece formed on the main outer wall protruding towards inside of the holding frame. The sub-frame member includes a sub-outer wall extending along the second side, sub-holding units formed on the sub-outer wall to hold the solar cell panel from the second-side side, and a cylindrical part formed to include the sub-outer wall, extending along the second side on the back surface side of the solar cell panel.

4 Claims, 4 Drawing Sheets

(56) References Cited

U.S. PATENT DOCUMENTS

| | | | |
|---|---|---|---|
| 2011/0011446 A1 | 1/2011 | Hirayama | |
| 2011/0088781 A1* | 4/2011 | Yamamoto | H02S 30/10 |
| | | | 136/259 |
| 2011/0120529 A1 | 5/2011 | Nakamura | |

FOREIGN PATENT DOCUMENTS

| | | | | | |
|---|---|---|---|---|---|
| JP | 10004207 | A | * | 1/1998 | H02S 20/23 |
| JP | 2000243998 | A | * | 9/2000 | F24J 2/5211 |
| JP | 2003-282919 | A | | 10/2003 | |
| JP | 2009-57757 | A | | 3/2009 | |
| JP | 2009-059947 | A | | 3/2009 | |
| JP | 2009057757 | A | * | 3/2009 | |
| JP | 2009-302484 | A | | 12/2009 | |
| JP | 4611454 | B2 | | 1/2011 | |
| JP | 2011-35255 | A | | 2/2011 | |
| JP | 2015-149412 | A | | 8/2015 | |
| JP | 2015-156453 | A | | 8/2015 | |
| WO | WO 2009/119775 | A1 | | 10/2009 | |
| WO | WO 2009/154165 | A1 | | 12/2009 | |

OTHER PUBLICATIONS

Office Action (Notice of Rejection) dated Jun. 16, 2015, by the Japanese Patent Office in corresponding Japanese Patent Application No. 2014-525642, and an English Translation of the Office Action. (5 pages).

International Search Report (PCT/ISA/210) dated Aug. 28, 2012, by the Japanese Patent Office as the International Searching Authority for International Application No. PCT/JP2012/068467.

Written Opinion (PCT/ISA/237) dated Aug. 28, 2012, by the Japanese Patent Office as the International Searching Authority for International Application No. PCT/JP2012/068467.

Chinese Office Action dated Apr. 28, 2016 issued in corresponding Chinese Application No. 201280073957.8, with partial English translation.

Office Action dated Jan. 26, 2016 by the Japanese Patent Office in corresponding Japanese Patent Application No. 2014-525642, and a translation thereof.

Chinese Office Action dated Nov. 10, 2016 issued in corresponding Chinese Application No. 201280073957.8, and a partial English translation thereof.

Third Office Action dated May 17, 2017 in corresponding Chinese Application No. 201280073957.8, and a translation thereof (15 pages).

* cited by examiner

HOLDING FRAME AND SOLAR CELL MODULE

FIELD

The present invention relates to a holding frame and a solar cell module, and more particularly to a draining structure of a holding frame.

BACKGROUND

Generally, a solar cell module is constituted by a rectangular solar cell panel that is constituted by solar cells arranged in plural and a frame member (a holding frame) that holds the solar cell panel.

In recent years, in order to maintain the strength of the frame member, frames that are hollow in cross section have been increasingly used. When the cross-section of the frame has a hollow shape, fluid tends to be accumulated inside of the frame. Accordingly, in a cold region, fluid accumulated inside of the frame freezes and expands, and may possibly deform the frame.

The following techniques are known as countermeasures for this problem. That is, Patent Literature 1 discloses a technique of providing draining holes in a hollow-shape frame and Patent Literature 2 discloses a technique of constituting a cross-section of a frame in a configuration in which a path connected to outside is provided at an abutting section of frames that are orthogonal to each other.

CITATION LIST

Patent Literatures

Patent Literature 1: Japanese Patent Application Laid-open No. 2009-302484
Patent Literature 2: Japanese Patent No. 4611454

SUMMARY

Technical Problem

However, the cost for machining holes in a hollow-shape frame is high, and fluid at the ends of the frame may not be drained. In addition, when the draining function is provided in the cross-section of the frame, a restriction will be imposed on the strength design of the frame.

The present invention has been achieved in view of the above problems, and an object of the present invention is to provide a holding frame that can make smooth draining of fluid accumulated in a hollow part of the frame.

Solution to Problem

In order to solve the aforementioned problems, a holding frame according to one aspect of the present invention surrounding the periphery of a solar cell panel that has a light-receiving surface of a substantially rectangular shape is constructed as to include: a main frame member that is provided to extend along first sides facing each other out of all sides constituting the light-receiving surface; and a sub-frame member that is provided to extend along second sides adjacent to the first sides and facing each other, wherein the main frame member includes a main outer wall that is formed to be upright in a substantially vertical manner to the light-receiving surface and is formed to extend along the first side, a main holding unit that is formed on the main outer wall and holds the solar cell panel from the first-side side, and a main bottom piece that is formed on the main outer wall and protrudes towards inside of the holding frame on the back surface side of the light-receiving surface, the sub-frame member includes a sub-outer wall that is formed to be upright in a substantially vertical manner to the light-receiving surface and is formed to extend along the second side, a sub-holding unit that is formed on the sub-outer wall and holds the solar cell panel from the second-side side, and a cylindrical part that is formed to include the sub-outer wall and extends along the second side on the back surface side of the solar cell panel, the sub-frame member is coupled to the main frame member by abutting an end of the cylindrical part against an inner surface of the main outer wall, and a notch that allows the outside of the holding frame to communicate with the inside of the cylindrical part is formed on the main outer wall

Advantageous Effects of Invention

In the holding frame according to the present invention, a notch that allows the outside of the holding frame to communicate with the inside (a hollow part) of a cylindrical part is formed, and thus it is possible to make smooth draining of fluid accumulated in the hollow part.

DESCRIPTION OF EMBODIMENTS

Exemplary embodiments of a holding frame and a solar cell module according to the present invention will be explained below in detail with reference to the accompanying drawings. The present invention is not limited to the embodiments.

First Embodiment

Figure 1:
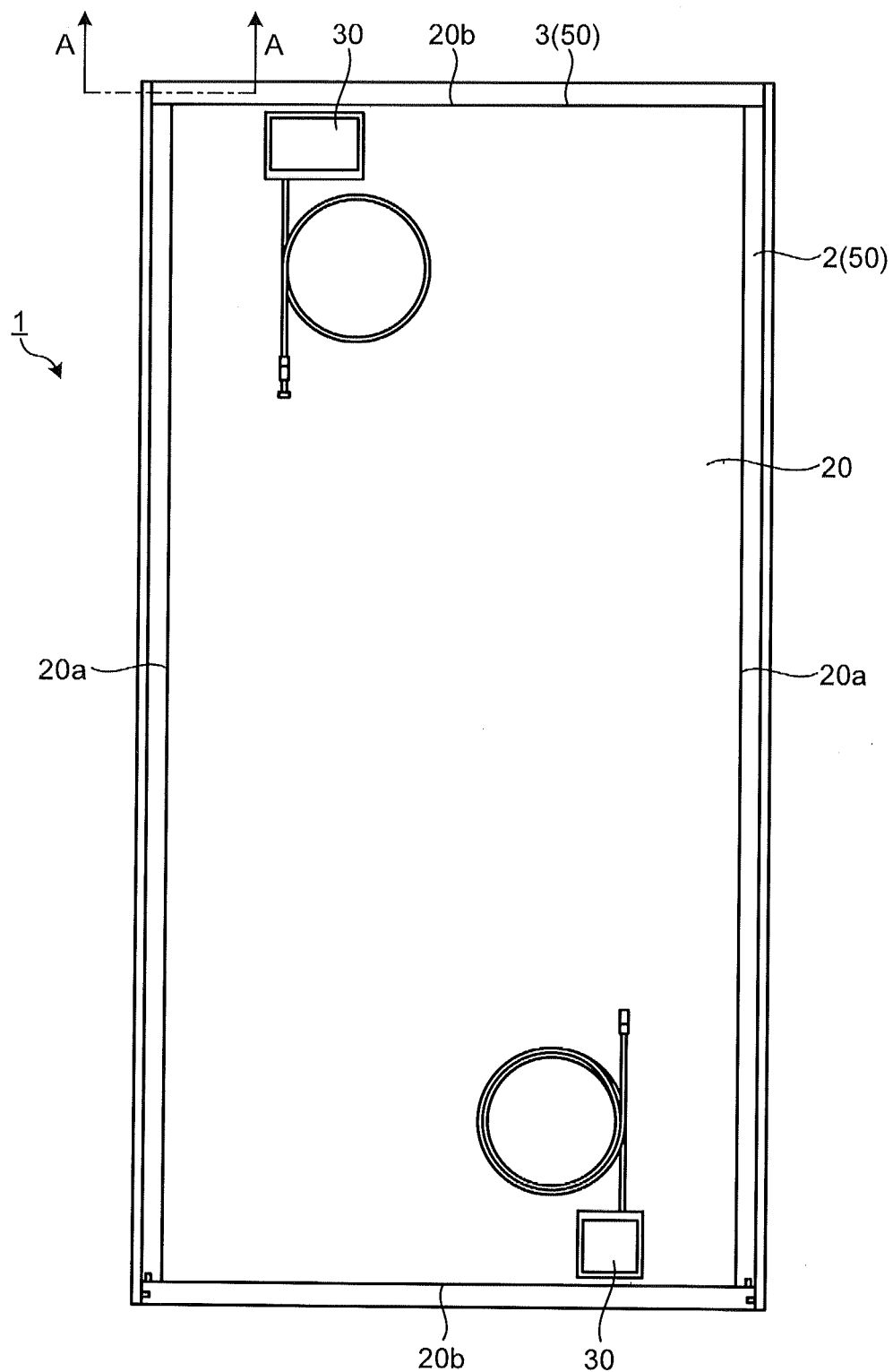
FIG. 1 is a plan view showing a schematic configuration of a solar cell module according to a first embodiment of the present invention.

FIG. 1 is a plan view showing a schematic configuration of a solar cell module according to a first embodiment of the present invention. A solar cell module 1 includes a solar cell panel 20 and a holding frame 50 that holds the solar cell module.

The solar cell panel 20 includes a light-receiving surface of a substantially rectangular shape. In the following explanations, the long side of the rectangular shape is referred to as "first side 20a", and the short side is referred to as "second side 20b". In the solar cell panel 20, serially connected solar cells are put between sealing materials, and the solar cells are laminated in a state where glass and a back sheet are formed on both outer sides. Terminal boxes 30 that extract generated electric power are attached on the back surface side of the light-receiving surface.

The holding frame 50 is a member having a frame shape and surrounding the periphery of the solar cell panel 20, and holds the solar cell panel 20. The holding frame 50 includes a main frame member 2 and a sub-frame member 3.

Figure 2:
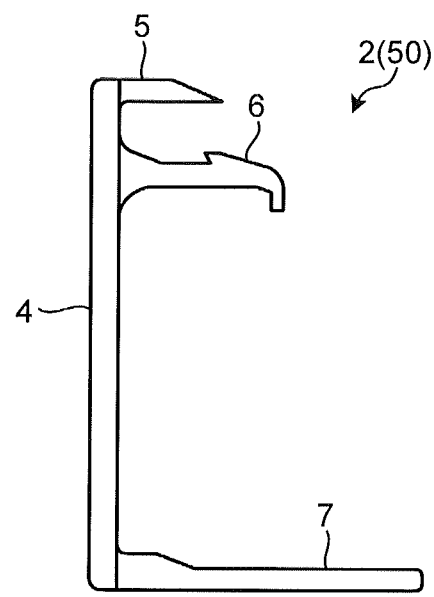
FIG. 2 is a cross-sectional view as a main frame member is viewed along a longitudinal direction.

FIG. 2 is a cross-sectional view when the main frame member 2 is viewed along a longitudinal direction. The main frame member 2 includes a main outer wall 4, an upper main holding piece (main holding unit) 5, a lower main holding piece (main holding unit) 6, and a main bottom piece 7. The main outer wall 4 is formed to be upright substantially vertically to a light-receiving surface, and is formed to extend along the first side 20a.

The upper main holding piece 5 and the lower main holding piece 6 are formed to protrude from the main outer wall 4 towards inside of the holding frame 50, such that the first side 20a of the solar cell panel 20 can be sandwiched and held by the light-receiving side and its back surface side. The upper main holding piece 5 and the lower main holding piece 6 are formed substantially on the whole area of the main frame member 2 along the longitudinal direction.

The main bottom piece 7 is formed to protrude towards inside of the lower part of the main outer wall 4 (a position on the back surface side of the solar cell panel 20 and further away from the lower main holding piece 6). The main bottom piece 7 is also formed substantially on the whole area of the main frame member 2 along the longitudinal direction. The main bottom piece 7 protrudes from the main outer wall 4 to be longer than the upper main holding piece 5 and the lower main holding piece 6, thereby contributing to the securement of the strength of the main frame member 2 as well as the holding frame 50.

Figure 3:
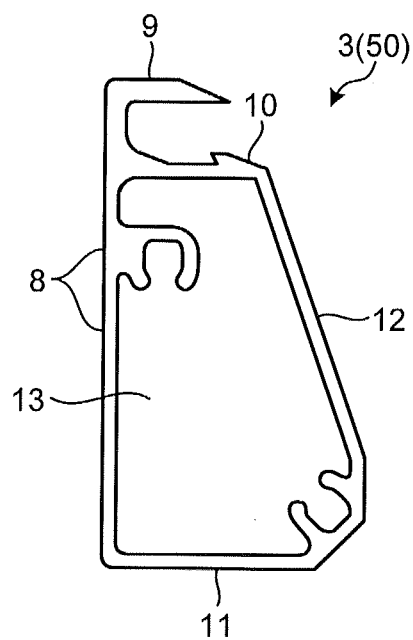
FIG. 3 is a cross-sectional view as a sub-frame member is viewed along a longitudinal direction.

FIG. 3 is a cross-sectional view when the sub-frame member 3 is viewed along a longitudinal direction. The sub-frame member 3 has a sub-outer wall 8, an upper sub-holding piece (sub-holding member) 9, a lower sub-holding piece (sub-holding member) 10, a sub-bottom piece 11, and a sub-inner wall 12. The sub-outer wall 8 is formed to be upright substantially vertically to a light-receiving surface, and is formed to extend along the second side 20b.

The upper sub-holding piece 9 and the lower sub-holding piece 10 are formed to protrude from the sub-outer wall 8 towards inside of the holding frame 50, such that the second side 20b of the solar cell panel 20 can be sandwiched and held by the light-receiving side and its back surface side. The upper sub-holding piece 9 and the lower sub-holding piece 10 are formed substantially on the whole area of the sub-frame member 3 along the longitudinal direction.

The sub-bottom piece 11 is formed to protrude towards inside of the lower part of the sub-outer wall 8 (a position on the back surface side of the solar cell panel 20 and further away from the lower sub-holding piece 10). The sub-bottom piece 11 is also formed substantially on the whole area of the sub-frame member 3 along the longitudinal direction. The sub-bottom piece 11 protrudes from the sub-outer wall 8 to be longer than the upper sub-holding piece 9 and the lower sub-holding piece 10, thereby contributing to the securement of the strength of the sub-frame member 3 as well as the holding frame 50.

The sub-inner wall 12 is formed to connect the lower sub-holding piece 10 and the sub-bottom piece 11. The sub-inner wall 12 is also formed substantially on the whole area of the sub-frame member 3 along the longitudinal direction. With this configuration, in the sub-frame member 3, a space that is surrounded by the sub-outer wall 8, the lower sub-holding piece 10, the sub-bottom piece 11, and the sub-inner wall 12 and extends along the second side 20b of the solar cell panel 20 is formed. In the following explanations, the space is referred to as "hollow part (cylindrical part) 13".

Figure 4:
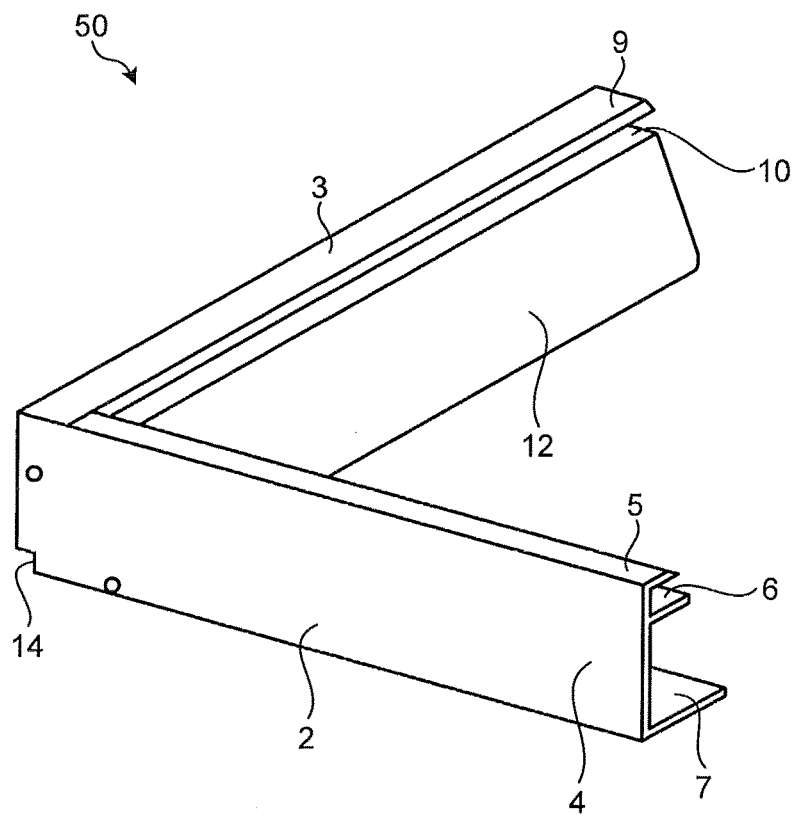
FIG. 4 is a partial enlarged perspective view in which a connecting part between a main frame member and a sub-frame member is enlarged.
Figure 5:
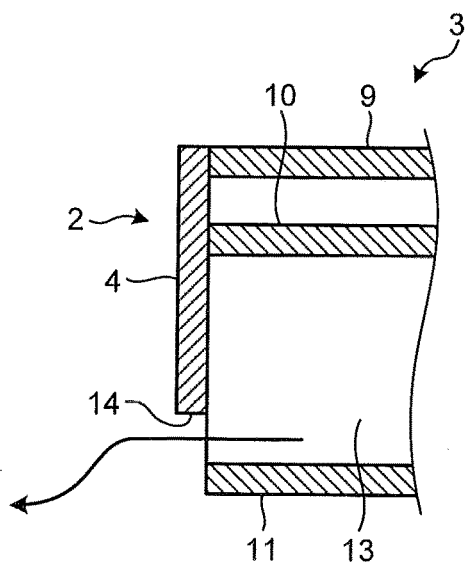
FIG. 5 is a cross-sectional view on arrow along a line A-A shown in FIG. 1.
Figure 6:
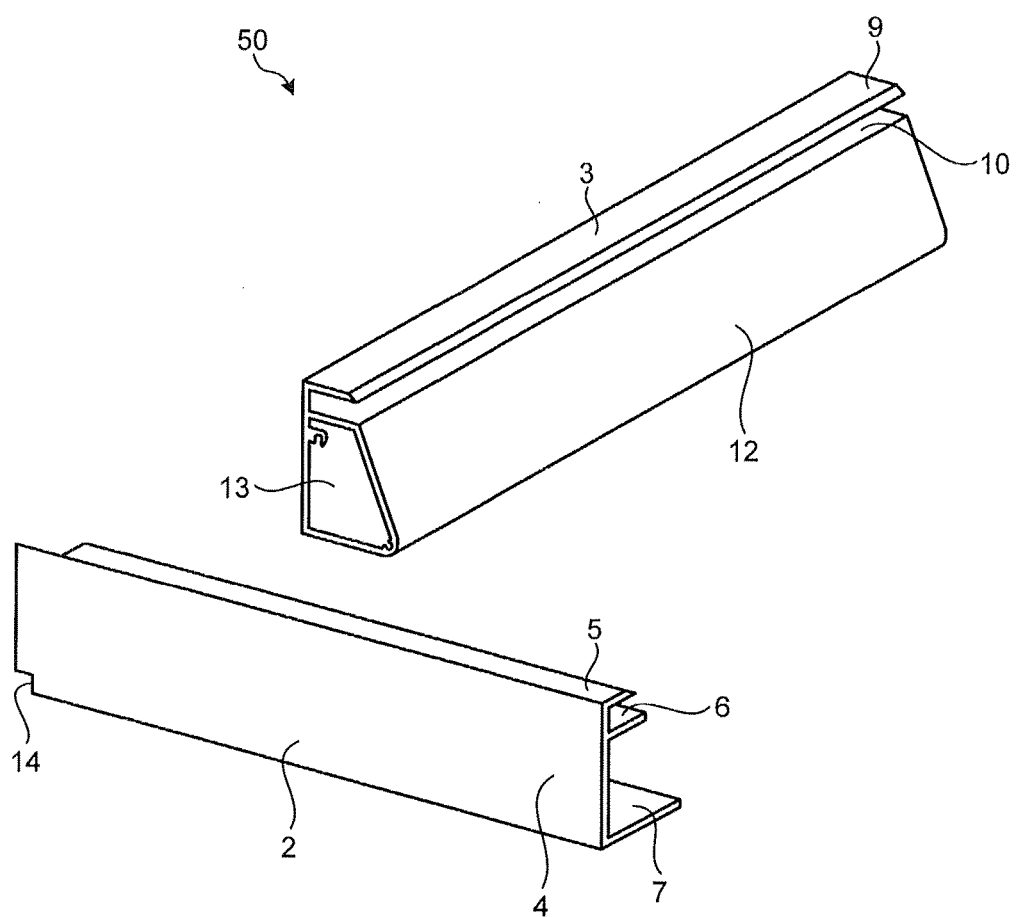
FIG. 6 is an exploded perspective view of the connecting part between the main frame member and the sub-frame member.

FIG. 4 is a partial enlarged perspective view in which a connecting part between the main frame member 2 and the sub-frame member 3 is enlarged. FIG. 5 is a cross-sectional view on arrow along a line A-A shown in FIG. 1. FIG. 6 is an exploded perspective view of the connecting part between the main frame member 2 and the sub-frame member 3. As shown in FIG. 4 and FIG. 5, the main frame member 2 and the sub-frame member 3 are connected by abutting an end of the hollow part 13 against the inner surface of the main outer wall 4 of the main frame member 2.

At the portion where the sub-frame member 3 abuts against the inner surface of the main outer wall 4, the upper main holding piece 5, the lower main holding piece 6, and the main bottom piece 7 are notched up to the main outer wall 4 with a width along the short-side direction of the sub-frame member 3.

On the main outer wall 4 of the main frame member 2, a notch 14 that penetrates the main outer wall 4 from the outer surface to the inner surface thereof is formed. As shown in FIG. 4 and FIG. 5, outside of the holding frame 50 and the hollow part 13 are communicated with each other through the notch 14.

All sides of the solar cell panel 20 are press-fitted through a buffering member such as an adhesive material into the holding units of the holding frame 50, which is configured and coupled as described above, and are mechanically held by screws or the like. Specifically, the first side 20a of the solar cell panel 20 is press-fitted and sandwiched between the upper main holding piece 5 and the lower main holding piece 6 of the main frame member 2, and the second side 20b is press-fitted and sandwiched between the upper sub-holding piece 9 and the lower sub-holding piece 10 of the sub-frame member 3.

As explained above, in the holding frame 50 and the solar cell module 1 according to the first embodiment, outside of the holding member 50 and the hollow part 13 are communicated through the notch 14, and thus rainwater or the like having flowed into the hollow part 13 is drained to outside through the notch 14. Furthermore, because the notch 14 is positioned at an end of the hollow part 13, fluid is hardly accumulated at the end of the hollow part 13.

Further, in a case in which the solar cell module 1 is mounted in a slanted outdoor location, if it is arranged with the sub-frame members 3 respectively being positioned at the top and the bottom side thereof, rainwater or the like having flowed into the inside of the hollow part 13 can be smoothly drained to outside.

Furthermore, the notch 14 is formed on the main outer wall 4 of the main frame member 2, which has not a structure in which the hollow part 13 is formed therein. Therefore, with the notch 14 being formed to drain fluid to outside, influences on the strength design of the main frame member 2 due to the presence of the hollow part 13 are suppressed, and a restriction on the strength design can be reduced.

By forming the lower end face of the notch 14 and the lower end face of the hollow part 13 to have substantially the same height, or forming the lower end face of the notch 14 to be positioned lower than that of the hollow part 13, draining of rainwater or the like from the hollow part 13 can be made more smoothly.

Further, as the shape of the light-receiving surface of the solar cell panel 20, a case in which the first side 20a is longer than the second side 20b has been explained as an example; however, the shape can be a square in which the length of the first side 20a and that of the second side 20b are equal.

Further, the main holding unit of the main frame member 2 and the sub-holding unit of the sub-frame member 3 are not limited to a structure in which the solar cell panel 20 is held by sandwiching, but various other configurations can be employed as far as the solar cell panel 20 can be fixed to the holding frame 50.

INDUSTRIAL APPLICABILITY

As described above, the holding frame according to the present invention is useful as a holding frame having a hollow part.

REFERENCE SIGNS LIST 1 solar cell module, 2 main frame member, 3 sub-frame member, 4 main outer wall, 5 upper main holding piece (main holding unit), 6 lower main holding piece (main holding unit), 7 main bottom piece, 8 sub-outer wall, 9 upper sub-holding piece (sub-holding member), 10 lower sub-holding piece (sub-holding member), 11 sub-bottom piece, 12 sub-inner wall, 13 hollow part (cylindrical part), 20 solar cell panel, 20a first side, 20b second side, 30 terminal box, 50 holding member.

The invention claimed is:

1. A holding frame surrounding the periphery of a solar cell panel that has a light-receiving surface of a substantially rectangular shape, the holding frame comprising:
a main frame member that is provided to extend along each of first sides facing each other out of all sides constituting the light-receiving surface; and a sub-frame member that is provided to extend along second sides, each being adjacent respectively to the first sides and facing each other, wherein
the main frame member includes a main outer wall that is formed to be upright in a substantially vertical manner to the light-receiving surface and is formed to extend along the first side, a main holding unit that is formed on the main outer wall and holds the solar cell panel from the first-side side, and a main bottom piece that is formed on the main outer wall and protrudes towards an inside of the holding frame on the back surface side of the light-receiving surface,
the sub-frame member includes:
  a sub-outer wall that is formed to be upright in a substantially vertical manner to the light-receiving surface and is formed to extend along the second side;
  an upper sub-holding piece that is formed to protrude from the sub-outer wall toward the inside of the holding frame and holds the solar cell panel from the second-side side;
  a lower sub-holding piece that is formed to protrude from the sub-outer wall towards the inside of the holding frame below the upper sub-holding piece and to have a protrusion length longer than that of the upper sub-holding piece;
  a sub-bottom piece that is formed to protrude towards the inside of the holding frame at a lower part of the sub-outer wall and to have a protrusion length longer than that of the lower sub-holding piece;
  a sub-inner wall that is formed to connect the terminal end of the lower sub-holding piece and a terminal inner end of the sub-bottom piece, such that the sub-inner wall and the sub-outer wall are not parallel;
  a hollow part that is defined by the sub-outer wall, the lower sub-holding piece, the sub-bottom piece and the sub-inner wall, the hollow part extending along the second side on the back surface side of the solar cell panel,
the sub-frame member is coupled to the main frame member by abutting an end of the hollow part against an inner surface of the main outer wall, and
a notch forming an opening in a terminal end of the main outer wall from the outer-side surface to the inner-side surface allowing the outside of the holding frame to communicate with the inside of the hollow part wherein the opening is arranged at a level equal to or lower than an inside surface of the sub-bottom piece.

2. The holding frame according to claim 1, wherein the light-receiving surface has a shape of a rectangle in which the second side is shorter than the first side.

3. A solar cell module including a solar cell panel that has a light-receiving surface of a substantially rectangular shape and a holding frame that surrounds the periphery of the solar cell panel, wherein
the holding frame including a main frame member that is provided to extend along each of first sides facing each other out of all sides constituting the light-receiving surface; and a sub-frame member that is provided to extend along second sides, each being adjacent respectively to the first sides and facing each other, wherein
the main frame member includes a main outer wall that is formed to be upright in a substantially vertical manner to the light-receiving surface and is formed to extend along the first side, a main holding unit that is formed on the main outer wall and holds the solar cell panel from the first-side side, and a main bottom piece that is formed on the main outer wall and protrudes towards an inside of the holding frame on the back surface side of the light-receiving surface,
the sub-frame member includes:
  a sub-outer wall that is formed to be upright in a substantially vertical manner to the light-receiving surface and is formed to extend along the second side,
  an upper sub-holding piece that is formed to protrude from the sub-outer wall toward the inside of the holding frame and holds the solar cell panel from the second-side side;
  a lower sub-holding piece that is formed to protrude from the sub-outer wall towards the inside of the holding frame below the upper sub-holding piece and to have a protrusion length longer than that of the upper sub-holding piece;
  a sub-bottom piece that is formed to protrude towards the inside of the holding frame at a lower part of the sub-outer wall and to have a protrusion length longer than that of the lower sub-holding piece;
  a sub-inner wall that is formed to connect the terminal end of the lower sub-holding piece and a terminal inner end of the sub-bottom piece, such that the sub-inner wall and the sub-outer wall are not parallel; and
  a hollow part that is formed to include the sub-outer wall and a sub-bottom piece that forms a bottom wall of the hollow part, the hollow part extends along the second side on the back surface side of the solar cell panel, the sub-frame member is coupled to the main frame member by abutting an end of the hollow part against an inner surface of the main outer wall, and a notch forming an opening in a terminal end of the main outer wall from the outer-side surface to the inner-side surface allowing the outside of the holding frame to communicate with the inside of the hollow part wherein the opening is arranged at a level equal to or lower than an inside surface of the sub-bottom piece.

4. The solar cell module according to claim 3, wherein the light-receiving surface has a shape of a rectangle in which the second side is shorter than the first side.

\* \* \* \* \*